(12) United States Patent
Koyanagi et al.

(10) Patent No.: US 9,071,563 B2
(45) Date of Patent: Jun. 30, 2015

(54) DATA STORING METHOD USED FOR DATA STORE SERVER IN MAILING SYSTEM

(71) Applicant: Hitachi, Ltd., Tokyo (JP)

(72) Inventors: Izumi Koyanagi, Yokohama (JP); Masafumi Kinoshita, Sagamihara (JP); Kunihiko Toumura, Hachioji (JP); Naoki Haraguchi, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 199 days.

(21) Appl. No.: 13/718,757

(22) Filed: Dec. 18, 2012

(65) Prior Publication Data

US 2013/0246541 A1    Sep. 19, 2013

(30) Foreign Application Priority Data

Mar. 15, 2012 (JP) .................... 2012-058136

(51) Int. Cl.
*H04L 12/58* (2006.01)
(52) U.S. Cl.
CPC ............... *H04L 51/06* (2013.01); *H04L 51/22* (2013.01)
(58) Field of Classification Search
CPC ......... H04L 51/22; H04L 51/08; H04L 51/26; H04L 51/06
USPC .................................. 709/206, 223
See application file for complete search history.

(56) References Cited

U.S. PATENT DOCUMENTS 8,572,287 B2 * 10/2013 Ahmed et al. ............ 709/247
8,849,919 B2 * 9/2014 Gerstl et al. ............... 709/206
2006/0190830 A1 * 8/2006 Gerstl et al. ................ 715/757
2013/0110775 A1 * 5/2013 Forsythe ...................... 707/613
2013/0226907 A1 * 8/2013 Wolf ........................... 707/722

FOREIGN PATENT DOCUMENTS

JP   2000-207306 A   7/2000
JP   2002-132801 A   5/2002
JP   2006-260369 A   9/2006

OTHER PUBLICATIONS

Wang et al, "A Scalable Queuing Service based on an In-Memory Data Grid", IEEE International Conference on E-Business Engineering, IEEE Computer Society, Nov. 2010, IEEE Xplore Digital Library, <URL: http://ieeexplore.ieee.org/stamp/stamp.jsp?tp=&arnumber=5704322>.
Masafumi Kinoshita, et al., "Throughput Improvement of Mail Gateway in Cooperation with Distributed In-Memory KVS", Proceedings of the 2011 IEICE Society Conference, Communication (2), Aug. 30, 2011, p. 412.

* cited by examiner

*Primary Examiner* — Kristie Shingles
(74) *Attorney, Agent, or Firm* — Volpe and Koenig, P.C.

(57) ABSTRACT

A method in which a mail server for receiving mails manages sequence management information that records the sequence of mails stored in a data store server and the times at which a mail server sends the mails to a destination server, wherein the sequence management information is so managed as to satisfy the two conditions: one is to make not greater than a predetermined number the number of entries in any one of respective pieces of the divided sequence management information resulted by dividing the sequence management information into a plurality of pieces, each entry being included in each divided sequence management information piece and defined as a combination of key having the mail body of a certain mail as its value, and the time at which the certain mail is sent to the destination server.

4 Claims, 11 Drawing Sheets

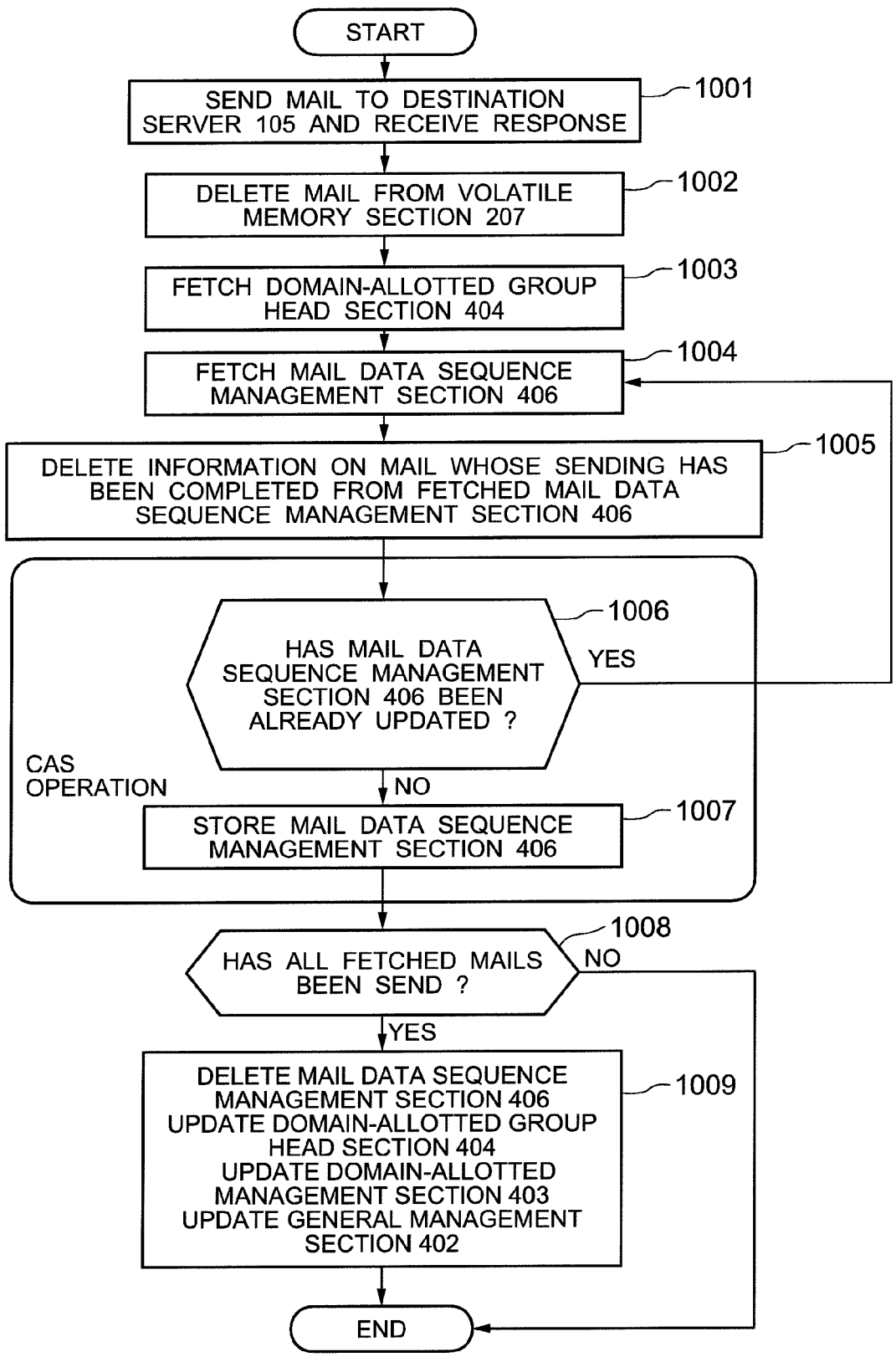

DATA STORING METHOD USED FOR DATA STORE SERVER IN MAILING SYSTEM

INCORPORATION BY REFERENCE

This application claims priority based on Japanese patent application No. 2012-058136 filed on Mar. 15, 2012, the entire contents of which are incorporated herein by reference.

BACKGROUND

The subject matter of the description relates to an improvement in the performance of mail delivery in a mailing system.

With the wide spread of mail distribution using mobile phones, mail service systems (hereafter referred to as mailing systems) provided by mobile communication carriers have come to process a large number of mails. The mobile communication carrier performs the process of relaying the mails received from mobile phones or through the Internet to their destinations by using a mail relaying system including a mail gateway and a data store server for storing the mails, both incorporated in the mobile communication carrier's equipment.

The mail relaying system performs the following processes to improve its communication capability in the course of mail relaying. First, the mail gateway receives a mail from a mobile phone, temporarily stores the received mail in a volatile memory, and relays the stored mail to the destination server. When the relaying task is successful, the mail gateway returns to the mobile phone a response that the mail has been successfully received, deletes the mail temporarily stored in the volatile memory, and then ends the mail relaying process.

During the mail relaying process, when a predetermined length of time has lapsed after the mail has been relayed to the destination server, the mail gateway provides a resending time for the sent mail and stores the resending time in a volatile or non-volatile memory in the data store server. Then, after having sent out to the mobile phone a response that it received the mail, the mail gateway deletes the mail stored in the volatile memory. Next, the mail gateway (not limited to the mail gateway that has performed mail receiving process) stores in the volatile memory the mail read from the volatile or non-volatile memory of the data store server, and relays the stored mail to the destination server in synchronism with the resending time. When this relaying process proved successful, the mail gateway deletes the mail stored in the volatile memory and in the volatile or non-volatile memory of the data store server, to end the relaying process.

It is customary that data store servers, which must usually store a huge amount of data, utilizes a so called "distributed in-memory KVS (key value store)" configuration in consideration of scalability and processing speed. The distributed in-memory KVS is a data storage in which a combination of key and value is stored in a volatile memory, can realize a high scalability, and provides a high process capability for in-memory configuration. In the in-memory KVS, the loss of data that may occur in the in-memory environment can be prevented through the replication of the data in a plurality of servers. Hereinafter, the process of storing the combination of key and value in a volatile memory is referred to as "storing"; the process of reading value corresponding to key from the volatile memory as "fetching"; and the process of deleting the combination of key and value from the volatile memory as "deleting".

Since in a mail system mails must be fetched and sent in the sequence in which they were stored in the KVS, the mails should be handled in such a queue configuration as FIFO (first in, first out). A method for realizing a queue configuration on KVS is known in, for example, JP-A-2002-132801 (referred to as Patent Literature 1) (cf. paragraph 0020). The technique disclosed in the patent literature 1 is to manage the sequence of mails on the KVS by using information for managing sequence (hereafter referred to as "sequence management information"). The sequence management information is that information which time-sequentially manages the times at which the mails stored in the KVS are sent out, and the combinations of values of mails and the corresponding keys. Since the sequence management information must be shared among all the mail gateways, it is stored on the KVS as values having specific keys.

However, since the size of data on the sequence management information increases in proportion to the increase in the number of mails stored in the data store server, the process of storing mails in the data store server and fetching the mails from the data store server takes much time in proportion to the number of the mails stored in the data store server so that the capability of mail distribution by the mail gateway becomes poor. There are two reasons for this:

Data cannot be partially fetched and stored in the KVS, and when the sequence management information is referred to and updated, it is necessary to fetch and update the entire sequence management information simultaneously. Accordingly, if the sequence management information becomes very large, the time required for the communication of data between the mail gateway and the KVS increases proportionately.

In order to secure the operations on the in-memory configuration, whenever data is stored in the KVS, there is need for a replicating operation. Accordingly, if the sequence management information becomes very large, the time required for the replicating operations increases proportionately.

There is a well-known method to avoid the increase of sequence management information size in a way that divides and manages the sequence management information.

The procedure for managing the sequence management information in a divided fashion includes a method of management using a list structure. The list structure links the each element in the list by using a pointer. In order to realize mail queues on the KVS, a set of the sending time of a mail and the key to the mail data is stored in each element. In fact, sequence management information is divided into units for each mail and the divided units are separately managed. By following this procedure, the process of storing and fetching mails can be performed without fetching unnecessary sequence management information so that an improvement in the mail distribution performance can be expected.

"A Scalable Queuing Service Based on an In-Memory Data Grid" by Yuan Wang, Han Chen, Bin Wang, Jing Min, and Hui Lei, 10-12 Nov. 2010, IEEE Xplore DIGITAL LIBRARY, <URL: http://ieeexplore.ieee.org/stamp/stamp.jsp?tp=&arnumber=5704322> (referred to as Literature 2) discloses a technique of managing all mails in a hierarchical manner by using two sorts of tables: one is the table of lower rank for managing sequence management information and the other is the table of higher rank for managing the table of lower rank. The table of lower rank stores the sequence management information covering a predetermined number of mails. In fact, the sequence management information is managed by being divided into a plurality of subsets each of which includes information for a predetermined number of mails. By following this technique, the process of storing and fetching mails can be performed without fetching unnecessary sequence management information.

SUMMARY

However, the method in which the sequence management information is managed by dividing it into a plurality of subset cannot be said to be adaptable to the features of the mail relaying system given below and therefore cannot improve the performance of distributing mails by the mail gateway. The features are:

- Mails ready for being sent are grouped together and the group is sent to the destination server, to improve the efficiency of mail sending.
- Mails waiting long before their sending times are not fetched in view of the N-to-N configuration for mail relaying servers.

If a management method using the list structure is to be practiced, since the sequence management information is split per mail, it becomes necessary to fetch those pieces of information whose number is the same as that of mails ready for being sent. This remarkably increases the number of accesses to the sequence management information, resulting in degradation in the performance of mail distribution.

Alternatively, if the technique disclosed in the Literature 2 mentioned above is to be practiced, the entire sequence management information is split into a plurality of information subsets each of which contains a predetermined number of mails. Accordingly, a mail ready for being immediately sent and a mail waiting long before being sent are included together in a certain information subset. This means that the fetching of mail sequence management information including mails which cannot be fetched takes place. This in turn increases the amount of data transferred between the mail gateway and the KVS, leading to degradation in the performance of mail distribution.

This specification discloses a method and an apparatus using the method, which can improve the performance of mail distribution by a mail gateway through the use of divisional management of sequence management information in consideration of the features of a mail relaying system.

As an example described more concretely below is provided a mail server (or referred to also as mail gateway) wherein when a mail received from a mail sending apparatus is stored in a data store server, reference is made to the sequence management information that contains the sequence of the stored mail and the time at which the stored mail is sent to the destination server to which the mail server sends mails, and wherein the method of managing the above described sequence management information requires two conditions as follows: one is to make not greater than a predetermined number the number of entries in any one of respective pieces of sequence management information resulted by dividing the sequence management information into a plurality of pieces, each entry being included in the sequence management information and defined as a combination of the key having the mail body of a certain mail as its value, and the time at which the certain mail is sent to the destination server; and the other is to make not greater than a predetermined value the difference between the earliest and latest sending times of mails included in all the entries contained within each piece of the divided sequence management information.

According to this disclosure, a mail relaying system having a high performance of mail distribution can be realized.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 11 is a flow diagram of a process for sending and deleting mails by the mail gateway 106.

DESCRIPTION OF THE EMBODIMENTS

Embodiments of the disclosed system will now be described in reference to the attached drawings.

Figure 1:
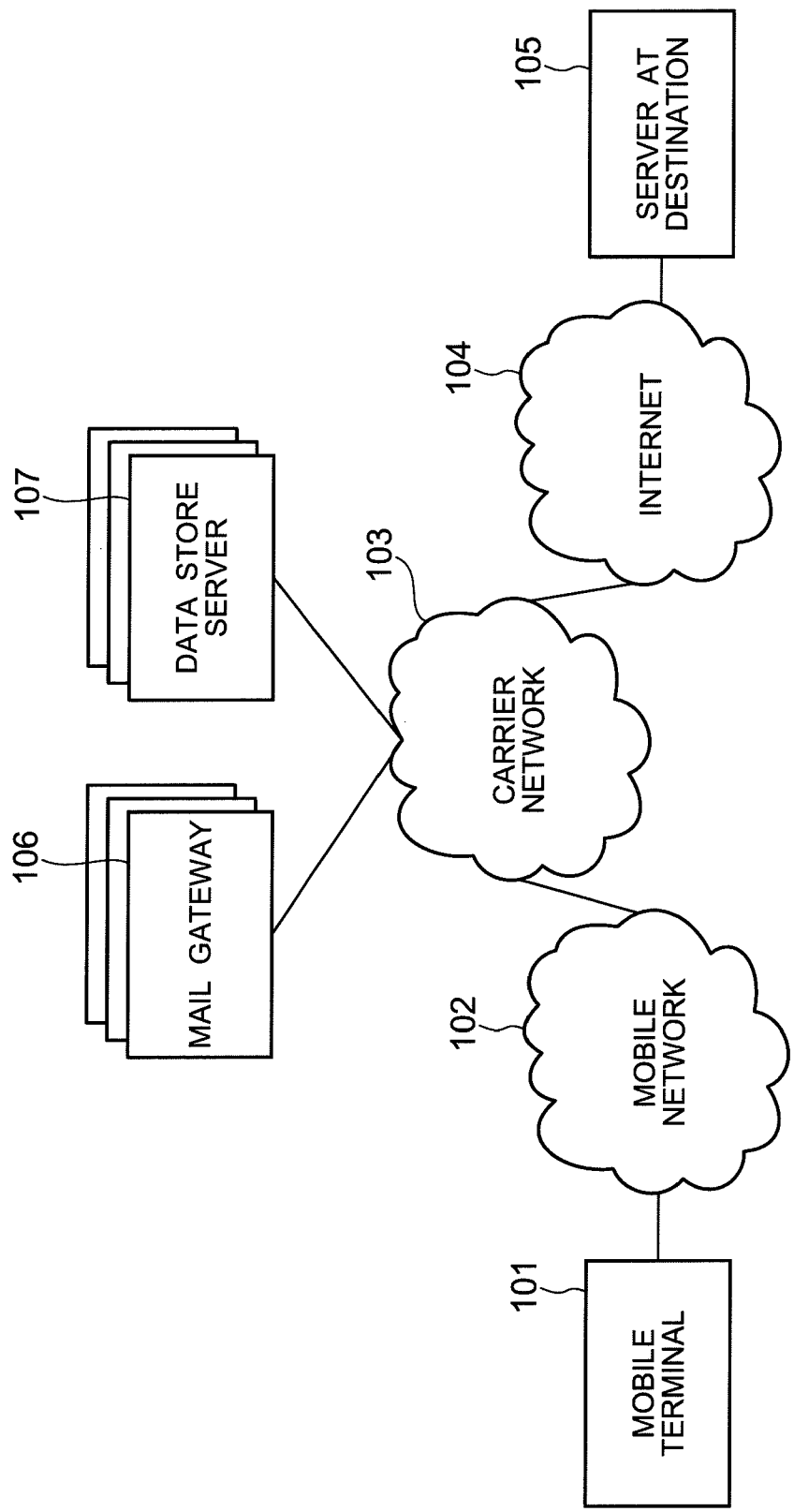
FIG. 1 illustrates the structure of a system according to the embodiment.

FIG. 1 illustrates the structure of a system.

A mobile terminal 101 is coupled via a mobile network 102 to a carrier network 103. The mobile network 102 is a wireless network between the mobile terminal 101 and the carrier network 103. The carrier network 103 is a network which couples the mobile network 102, the Internet 104, a mail gateway 106 and a data store server 107 to one another.

A destination server 105 sends a mail to and receives a mail from, the mail gateway 106 via the Internet 104. The mail gateway 106, which is coupled to the carrier network 103, receives mails sent from the mobile terminal 101 to the carrier network 103 and relays the mails to the destination server 105. The data store server 107, which is coupled to the carrier network 103, holds mails sent from the mail gateway 106.

Figure 2:
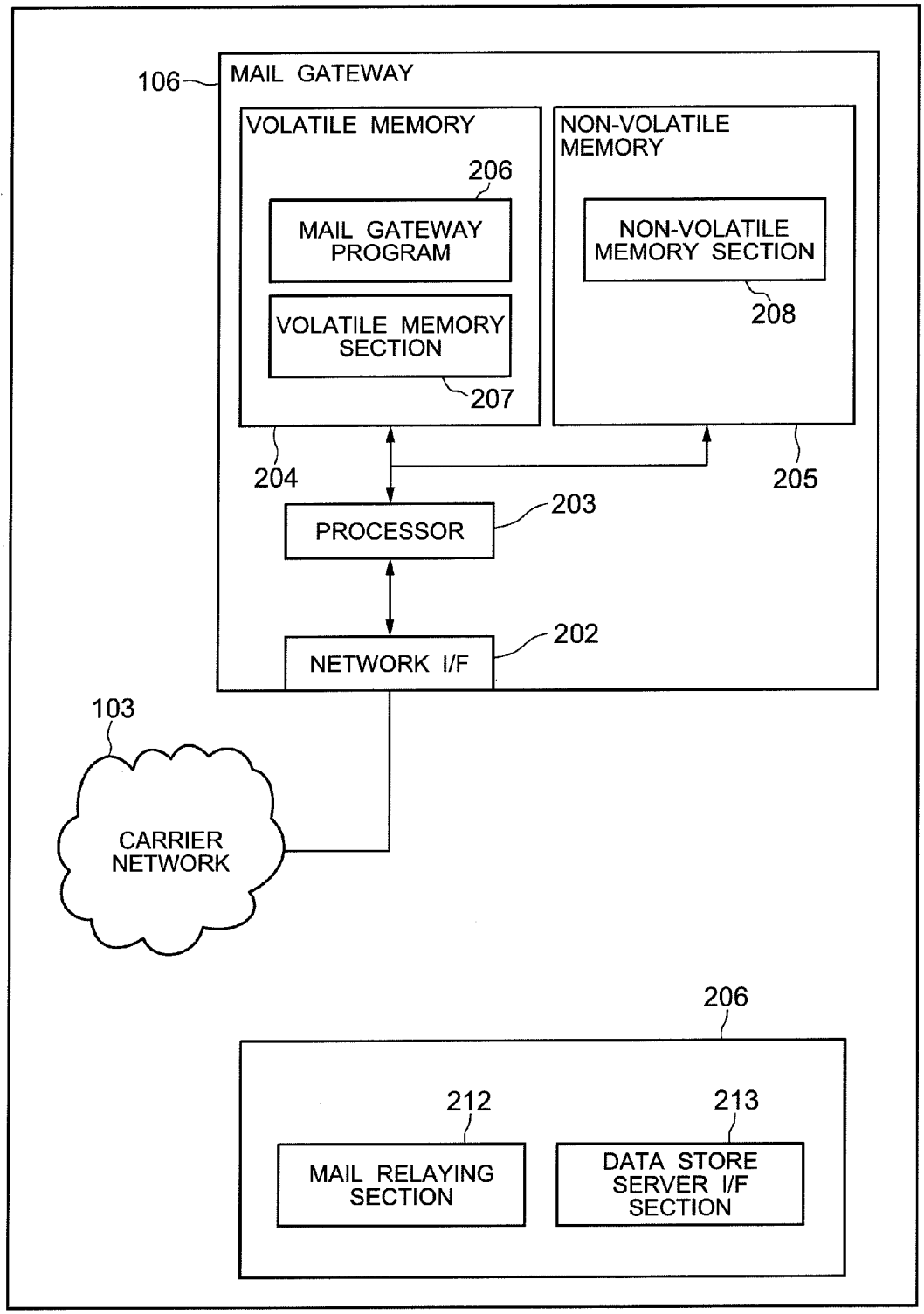
FIG. 2 illustrates the hardware configuration of an information processing apparatus serving as the mail gateway shown in FIG. 1.

FIG. 2 schematically shows the hardware configuration of an information processing apparatus serving as the mail gateway 106 shown in FIG. 1.

The information processing apparatus that serves as the mail gateway 106 comprises a network I/F 202, a processor 203, a volatile memory 204, a non-volatile memory 205, and an internal communication line such as a bus for coupling the foregoing components to one another. The mail gateway 106 is coupled via the network I/F 202 to the carrier network 103.

The volatile memory 204 stores a mail gateway program 206 and is provided with a volatile memory part 207 for storing data.

The mail gateway program 206 includes a mail relaying part 212 and a data store server I/F part 213. The mail relaying part 212 stores a variety of control programs that can realize the process in which the mail gateway 106 receives a mail from the mobile terminal 101 and relays the received mail to the destination server 105 as it is and the process in which a mail fetched from the data store server 107 is relayed to the destination server 105, and those processes are executed by means of the processor 203.

The data store server I/F part 213 records therein a variety of control programs that can realize the process in which the mail received at the time the relay thereof to the destination server 105 has failed is stored in the data store server 107 and the process in which the mail is fetched from the data store server 107. These processes are executed by means of the processor 203. The volatile memory part 207 stores the data managed by the mail gateway program 206.

The non-volatile memory 205 is provided with a non-volatile memory part 208. The non-volatile memory part 208 stores the data managed by the mail gateway program 206.

The mail relaying part 212 serves to handle the process taking place between the mobile terminal 101 and the mail gateway 106 and the process taking place between the mail gateway 106 and the destination server 105.

The data store server I/F part 213 serves to handle the process taking place between the mail gateway 106 and the data store server 107.

Figure 3:
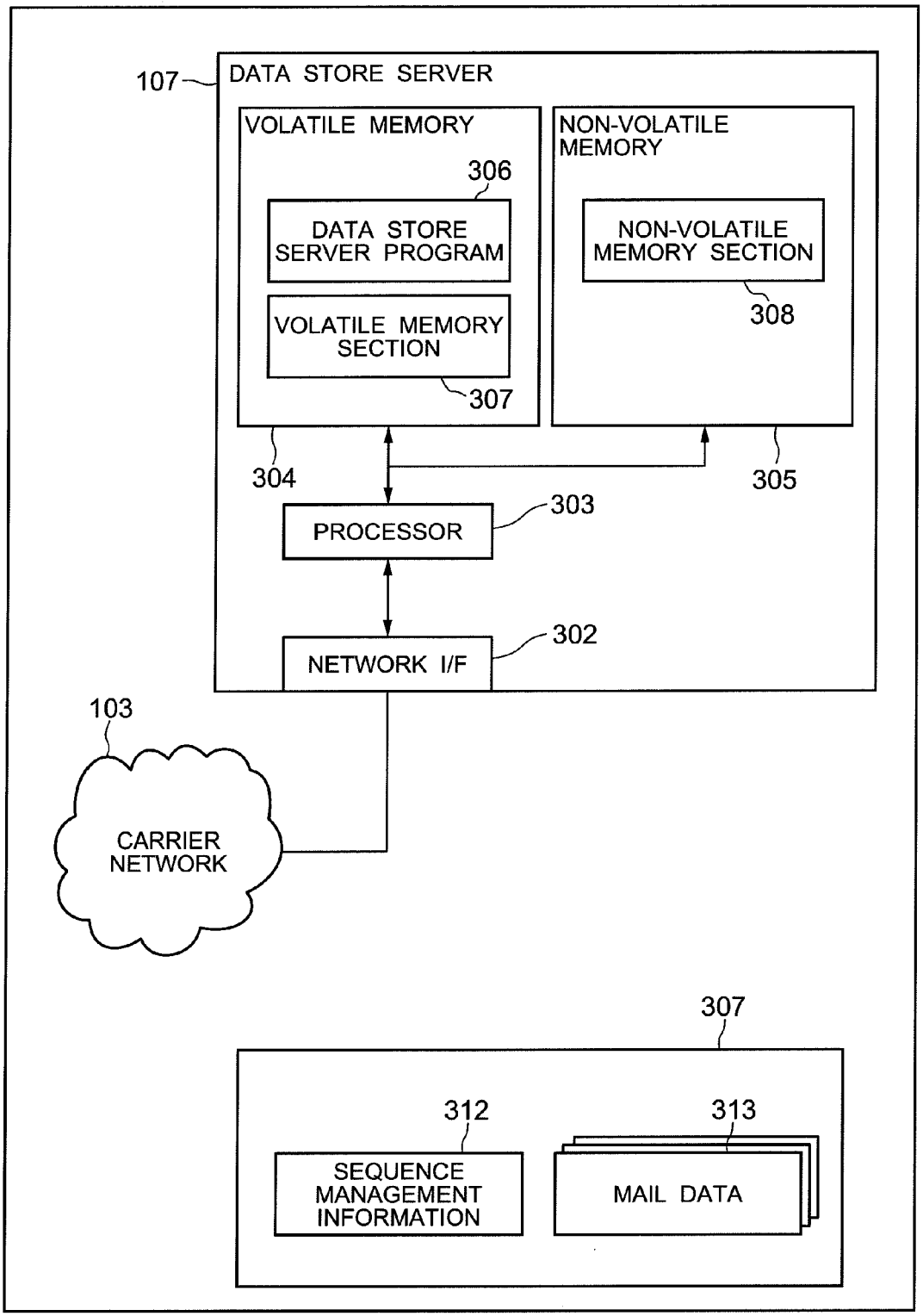
FIG. 3 illustrates the hardware configuration of an information processing apparatus serving as the data store server shown in FIG. 1.

FIG. 3 schematically shows the hardware configuration of an information processing apparatus serving as the data store server 107 shown in FIG. 1.

The information processing apparatus that serves as the data store server 107 comprises a network I/F 302, a processor 303, a volatile memory 304, a non-volatile memory 305, and an internal communication line such as a bus for coupling the foregoing components to one another. The data store server 107 is coupled via the network I/F 302 to the carrier network 103.

The volatile memory 304 stores a data store server program 306 and is provided with a volatile memory part 307 for storing data. The data store server program 306 records therein a variety of control programs that can realize the process of storing a combination of key and value received from the mail gateway 106 by the data store server 107 in the volatile memory part 307; the process of returning the value corresponding to the key received from the mail gateway 106 by the data store server 107; or the process of deleting the value corresponding to the key received from the mail gateway 106 by the data store server 107. These processes are executed by means of the processor 303.

The volatile memory part 307 stores the data managed by the data store server program 306.

The non-volatile memory 305 is provided with a non-volatile memory part 308. The non-volatile memory part 308 stores the data managed by the data store server program 306.

Mail data 313 is that which is stored in the data store server program 306 and sequence management information 312 is that which is used to manage the mail data 313 in accordance with their sending times. The content of the sequence management information 312 will be described later.

Figure 4:
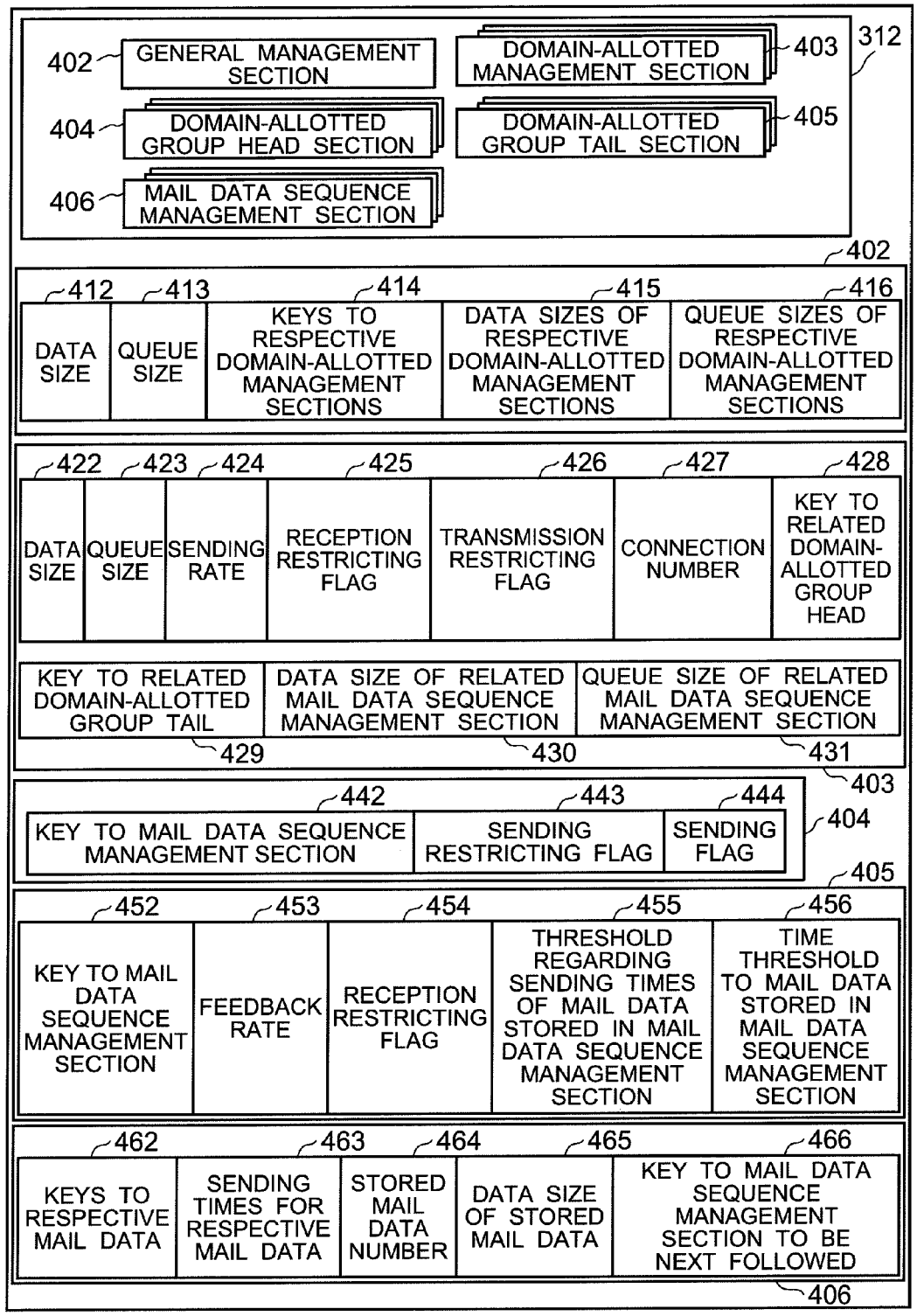
FIG. 4 illustrates an exemplary structure of the sequence management information 312.

FIG. 4 illustrates an exemplary structure of the sequence management information 312. In this embodiment, all mails are grouped according to the domains of their destination addresses. Further, in this embodiment, the mails grouped according to the domains of their destination addresses are still classified according to the Hash values of their destination addresses. The Hash function used for classification may be any function that can provide uniform classification as by a general Hash function such as MD 5 or SHA-1.

The sequence management information 312 includes a general management part 402, domain management parts 403, head parts of each domain group 404, tail parts of each domain group 405, and sequence management parts 406 of mail data. In this embodiment, the data store server 107 has a plurality of domain management parts 403, a plurality of head parts of each domain group 404, a plurality of tail parts of each domain group 405 and a plurality of sequence management parts 406 of mail data. Therefore, a specific data unit is identified by a reference numeral with an added alphabet, such as a domain management part 403a, whereas the general reference to the data units as a whole employs reference numeral alone without any added alphabet.

The general management part 402 includes data size 412, queue size 413, keys 414 to each management parts of each domain, data sizes 415 of each management parts of each domain, and queue sizes 416 of each management parts of each domain. The general management part 402 is that which is the data for aggregately managing the mails and their associated information stored in the data store server 107.

The data size 412 represents the number of the total bytes of all the mails stored in the data store server 107. This number can also be represented by the sum of the data sizes 415 of the each management parts of each domain. When this number reaches the upper limit of the number of bytes storable in the data store server 107, the storing of additional mails in the data store server 107 is restricted. It should be noted here that the upper limit may be defined as a predetermined value recorded in the mail gateway program 206 in the mail gateway 106, or that it may be stored in the volatile memory part 307 in the data store server 107 and referred to as needed.

The queue size 413 represents the number of all the mails stored in the data store server 107. This number can also be given as the sum of the queue sizes 416 of each management parts of each domain. When this number reaches the upper limit of the number of mails storable in the data store server 107, the storing of additional mails in the data store server 107 is restricted. It should be noted here that the upper limit may be defined as a predetermined value recorded in the mail gateway program 206 in the mail gateway 106, or that it may be stored in the volatile memory part 307 in the data store server 107 and referred to as needed.

keys 414 to each management parts of each domain store the keys to domain management parts 403, each key having its specific value, for example, for a single domain management part 403a.

Data size 415 of each management parts of each domain stores the number of the total bytes of the mails managed by each of domain management part 403a, with those mails managed by a domain management part 403a, for example, provided with its unique ID name.

Queue size 416 of each management parts of each domain stores the number of all the mails managed by each of domain management part 403a, with those mails managed by a domain management part 403a, for example, provided with its unique ID name.

Each management part 403 of each domain includes data size 422, queue size 423, sending rate 424, reception control flag 425, transmission control flag 426, connection number 427, keys 428 to each head part of each domain group, keys 429 to each tail part of each domain group, data sizes 430 of each sequence management part of mail data, and queue sizes 431 of each sequence management part of mail data.

The data size 422 represents the number of all the bytes of those mails under management of the each domain management parts 403 which are among all the mails stored in the data store server 107. This number can also be given as the sum of the data sizes 430 of each sequence management part of mail data. When this number reaches the upper limit of the number of bytes defined for each domain and storable in the data store server 107, the storing of additional mails in the data store server 107 is restricted. It should be noted here that the upper limit may be defined as a predetermined value in the mail gateway program 206 in the mail gateway 106, or that it may be stored in the volatile memory part 307 in the data store server 107 and referred to as needed.

The queue size 423 represents the number of those mails under the management of the respective domain management parts 403 which are among all the mails stored in the data store server 107. This number can also be given as the sum of the queue sizes 431 of each sequence management part of mail data. When this number reaches the upper limit of the number of mails defined for each domain and storable in the data store server 107, the storing of additional mails in the data store server 107 is restricted. It should be noted here that the upper limit may be defined as a predetermined value recorded in the mail gateway program 206 in the mail gateway 106, or that it may be stored in the volatile memory part 307 in the data store server 107 and referred to as needed.

The sending rate 424 represents two values: the number of mails sent per second that are under the management of each domain management parts 403 and that are among all the mails stored in the data store server 107; and the time at which the last mail was sent. These values are needed for restricting sending (i.e. throttling) when many mails are successively sent to a specific destination. When the number of mails sent per second reaches a predetermined sending rate defined for each domain, the resending of mails is restricted. It should be noted here that the predetermined sending rate defined for each domain may be defined as a predetermined value recorded in the mail gateway program 206 in the mail gateway 106, or that it may be stored in the volatile memory part 307 in the data store server 107 and referred to as needed.

The reception control flag 425 indicates whether or not a certain received mail can be stored as data under the management of that domain management part 403a which is uniquely selected depending on destination address. If the reception control flag 425 is set up, the storing of the received mail under the management of the domain management part 403a fails.

The transmission control flag 426 indicates whether or not those mails under the management of that domain management part 403a which are among all the mails stored in the data store server 107, can be sent.

The connection number 427 indicates the number of connections established between the data store server 107 and the destination server 105, through which those mails under the management of domain management part 403a which are among all the mails stored in the data store server 107, are sent. When the number reaches a predetermined number of connections for each domain, the resending of mails is restricted.

It should be noted here that the predetermined sending rate defined for each domain may be defined as a predetermined value recorded in the mail gateway program 206 in the mail gateway 106, or that it may be stored in the volatile memory part 307 in the data store server 107 and referred to as needed.

The keys 428 to each head part of each domain group hold the key which has the head parts of each domain group 404 as its value.

The keys 429 to each tail part of each domain group hold the key which has the tail parts of each domain group 405 as its value.

The data sizes 430 of each sequence management part 406 of mail data store the data size of the mails stored in the sequence management part 406 of mail data managed in the pertinent domain, along with a unique ID name given to the sequence management part 406 of mail data. And similar data sizes 430 are provided for all the sequence management part 406 of mail data.

The queue size 431 of each sequence management part 406 of mail data store the number of the mails stored in the sequence management part 406 of mail data managed in the pertinent domain, along with a unique ID name given to the sequence management part 406 of mail data. And similar queue sizes 431 are provided for all the sequence management parts 406 of mail data.

The head parts 404 of each domain group includes key 442 to sequence management part of mail data, sending control flag 443, and sending flag 444.

The key 442 to sequence management part of mail data holds the key to that one of the sequence management parts 406 of mail data which manages a group of mails containing a mail having the earliest sending time.

The sending control flag 443 indicates whether or not any of the mails managed under the pertinent domain group can be sent to the destination server 105. This flag is set when a series of mails are sent continuously to a specific destination.

The sending flag 444 indicates whether or not any of the mails managed under the domain group is being sent from the mail gateway 106 to the destination server 105. If a mail managed under the domain group is sent by a mail gateway 106 while another mail managed under the same domain group is being sent by another mail gateway 106b, a reversion in sending sequence or double sending will take place. This inconvenience can be avoided by utilizing the sending flag 444. If the sending flag 444 is set up, this means that a mail managed under the domain group is being sent from a mail gateway 106. Accordingly, no other mail managed under the same domain group is sent. And if it is necessary to send another mail managed under the same domain group, the sending flag 444 must be set up before sending and the flag must be reset after sending.

The tail parts 405 of each domain group includes key 452 to sequence management part of mail data, feedback rate 453, reception control flag 454, threshold number 455 of stored mail data in the sequence management part of mail data, and threshold time 456 of stored mail data in the sequence management part of mail data.

The key 452 to sequence management part of mail data holds the key to that one of the sequence management parts 406 of mail data which manages a group of mails containing a mail having the latest sending time.

The feedback rate 453 represents the frequency of updates of management information stored in the general management part 402 and the domain management parts 403. The feedback rate can take an integer equal to or greater than 1. It should be noted here that the smaller the integer is, the higher the frequency of updates, and that the larger the integer is, the lower the frequency of updates. The feedback rate may be a constant, or dynamically varied depending on the number of mails stored in the data store server 107.

The reception control flag 454 indicates whether or not the storage of mails to a certain domain group is restricted. It is when a newly received mail is stored that the reception control flag 454 is effective. Thus, this flag is not effective if a mail, whose resending has failed, is stored. When the reception control flag 454 is set up, the storing of mails fails and an error response is returned to the mobile terminal 101. It is when the number of all the stored mails or the number of mails stored in each domain group exceeds a predetermined value that the reception control flag 454 is set up.

The threshold number 455 of stored mail data in the sequence management part of mail data represents the upper limit to the number of mails storable in the sequence management 406 of mail data. This upper limit value may be a constant, or recorded as information for aggregately managing parameters in the volatile memory 307 in the data store server 107, and referred to as needed.

The threshold time 456 of stored mail data in the sequence management part of mail data represents the upper limit to the greatest difference with respect to the sending times of the mails storable in the sequence management parts 406 of mail data. In fact, the time difference between the earliest sending time and the latest sending time with respect to all the mails stored in the sequence management parts 406 of mail data must be smaller than the threshold time 456 of stored mail data in the sequence management part of mail data. This upper limit value may be a constant, or recorded as information for aggregately managing parameters in the volatile memory 307 in the data store server 107, and referred to as needed.

The sequence management part 406 of mail data includes keys 462 to each mail data, sending times 463 of each mail data, number 464 of stored mail data, stored mail data size 465, and key 466 to sequence management part of mail data to be followed.

The keys 462 to each mail data stores keys corresponding to values specifying the bodies of mails managed by the pertinent sequence management part 406 of mail data.

The sending times 463 of each mail data stores the sending times of mails managed by the pertinent sequence management part 406 of mail data.

The number 464 of stored mail data stores the number of mails managed by the pertinent sequence management part 406 of mail data.

The stored mail data size 465 stores the total data size of mails managed by the pertinent sequence management part 406 of mail data.

The key 466 to sequence management part of mail data to be followed stores the key to the sequence management part 406 of mail data which stores that group of mails which are to be sent after the mail group managed by the pertinent sequence management part 406 of mail data. If there is no such sequence management part 406 of mail data which stores the group of mails to be next sent, "NULL" is stored instead.

Figure 5:
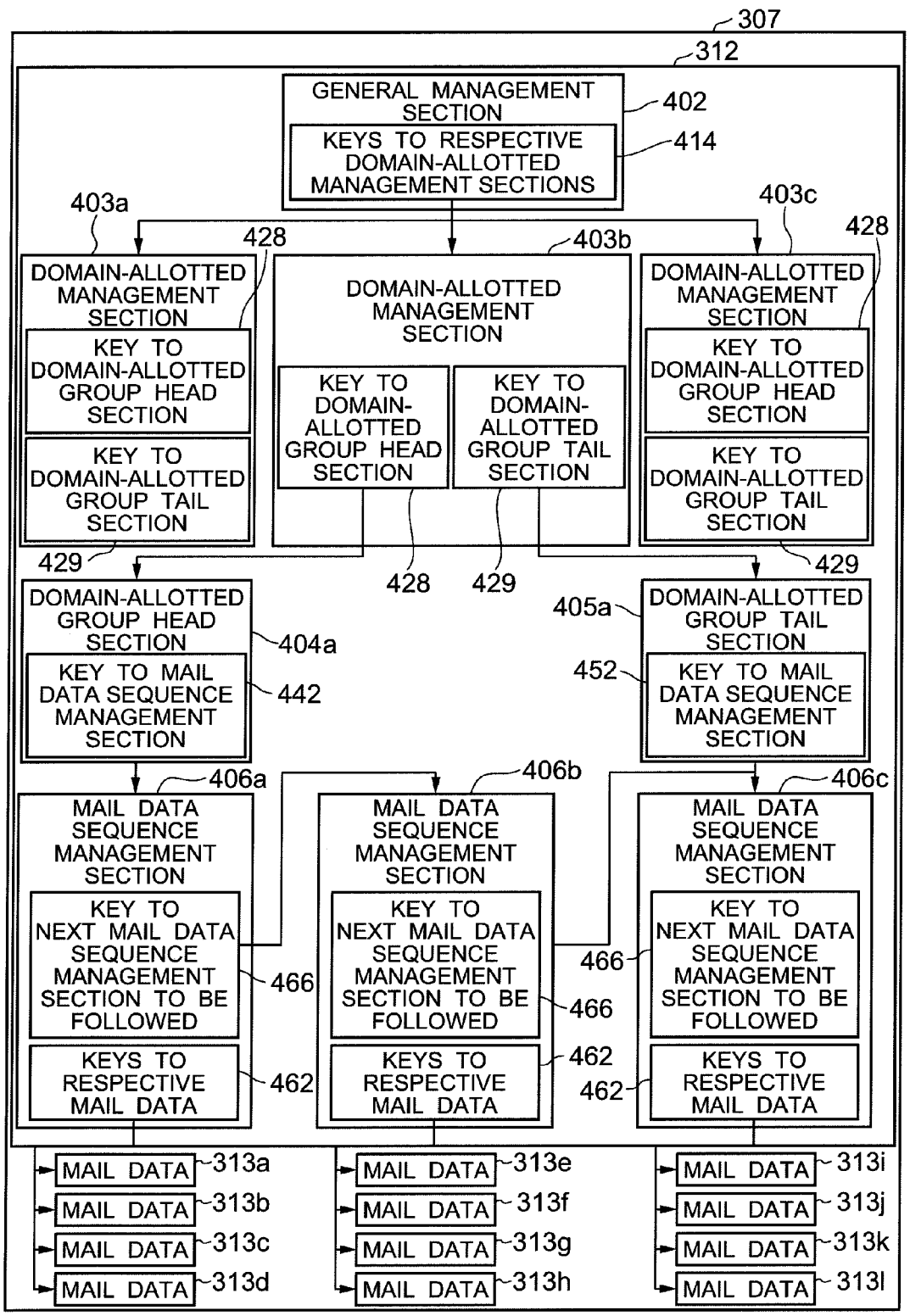
FIG. 5 illustrates the relationship between the various data included in the sequence management information 312 and mail data 313.

FIG. 5 illustrates the relationship between various data included in the sequence management information 312 shown in FIG. 4 and mail data 313, both stored in the volatile memory part 307 of the data store server 107. The data which constitute the sequence management information 312 can provide a relationship between particular data and its associated destination data since a reference to the key to the particular data can lead to the associated destination data. In FIG. 5, in order to reach desired data by referring to its associated key, the paths from the desired data to the destination data are indicated with lines and arrows. Also, in FIG. 5, in order to clarify the structure of the entire data system, every data piece is labeled with a key to another piece of data.

The general management part 402 holds keys 414 to each management parts of each domain so that the respective domain management parts 403 are fetched by referring to the keys 414.

The domain management parts 403 hold the keys 428 to each head part of each domain group and the keys 429 to the each tail part of each domain group so that the respective head parts 404 of each domain group and the respective tail parts 405 of each domain group are fetched by referring to the keys 428 and 429.

The head parts 404 of each domain group hold the keys 442 to the sequence management parts 406 of mail data, and the tail parts 405 of each domain group hold the keys 452 to the sequence management parts 406 of mail data. The head parts 404 of each domain group and the tail parts 405 of each domain group can both fetch the sequence management parts 406 of mail data by referring to the keys they hold.

The sequence management parts 406 of mail data hold the keys 466 to the sequence management part of mail data to be followed, and can fetch the next sequence management part of mail data by referring to the keys 466. Further, the sequence management parts 406 of mail data hold the keys 462 to each mail data so that respective mail data 313 can be fetched by referring to the keys 462. The general management part 402 in the sequence management information 312 holds the keys 414 to the domain management parts 403, and the domain management parts 403 hold the keys 428 to the head parts 404 of each domain group and the keys 429 to the tail parts 405 of each domain group. Accordingly, the general management part 402, the domain management parts 403, the head parts 404 of each domain group and the tail parts 405 of each domain group constitute a hierarchical structure. Further, the head parts 404 of each domain group and the tail parts 405 of each domain group hold the keys to the sequence management parts 406 of mail data, the sequence management parts 406 of mail data hold the keys to the next sequence management part of mail data, and the sequence management part of mail data are linked to one after another. Accordingly, the head parts 404 of each domain group, the tail parts 405 of each domain group and the sequence management parts 406 of mail data constitute a linked-list structure.

Figure 6:
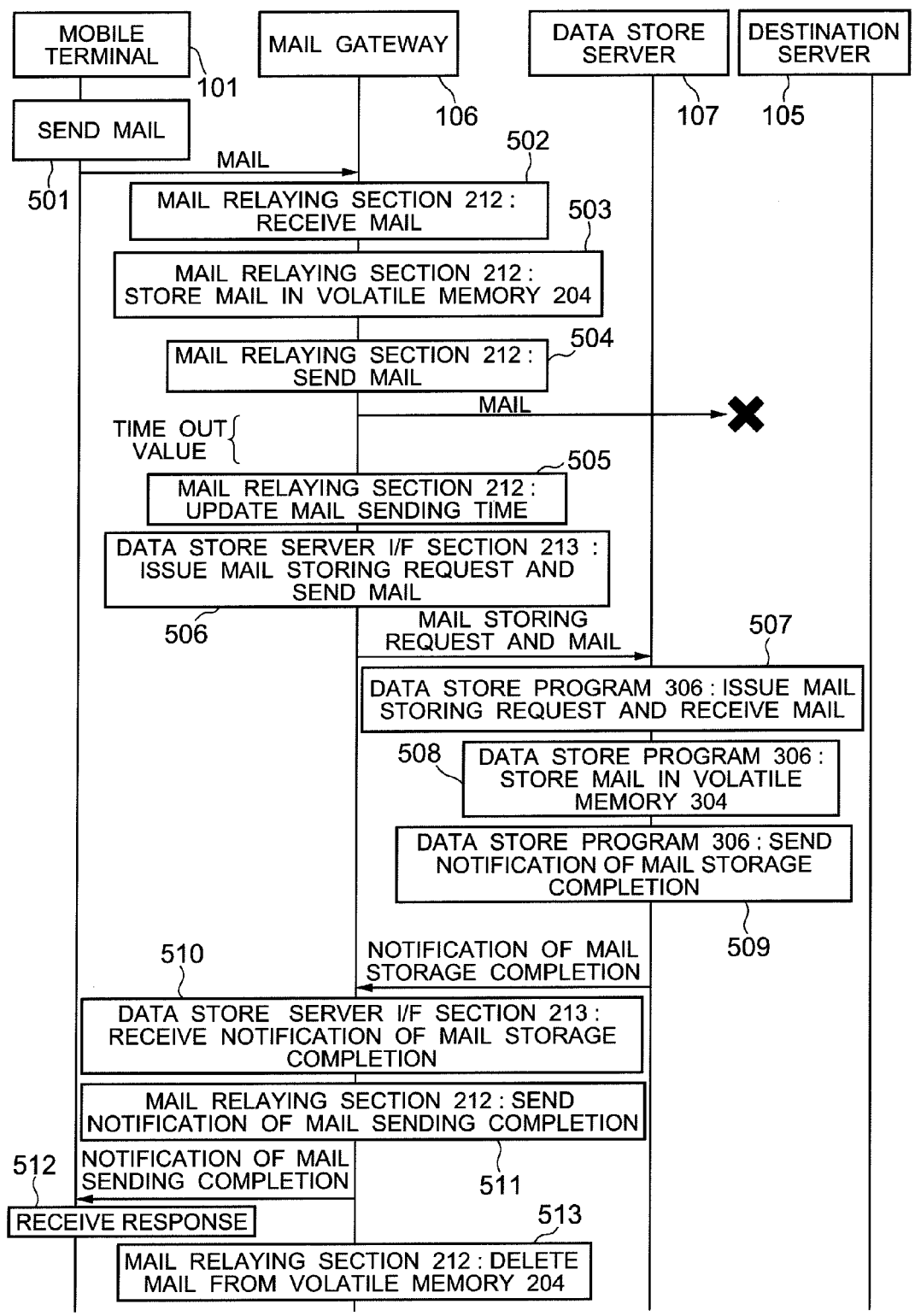
FIG. 6 is a flow diagram exemplifying a sequence of receiving mails by the mail gateway 106.
Figure 7:
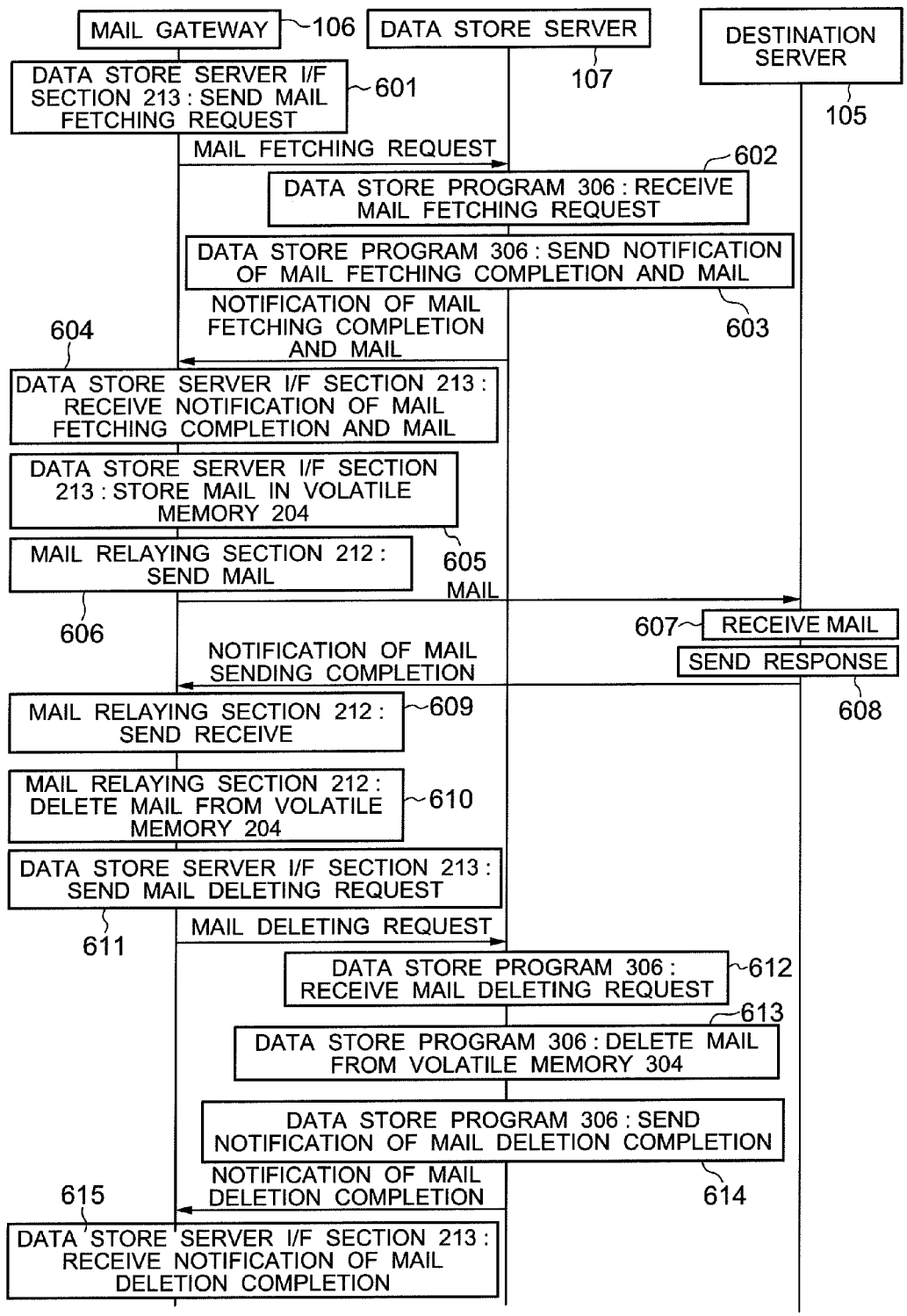
FIG. 7 is a flow diagram exemplifying a sequence of sending mails by the mail gateway 106.
Figure 8:
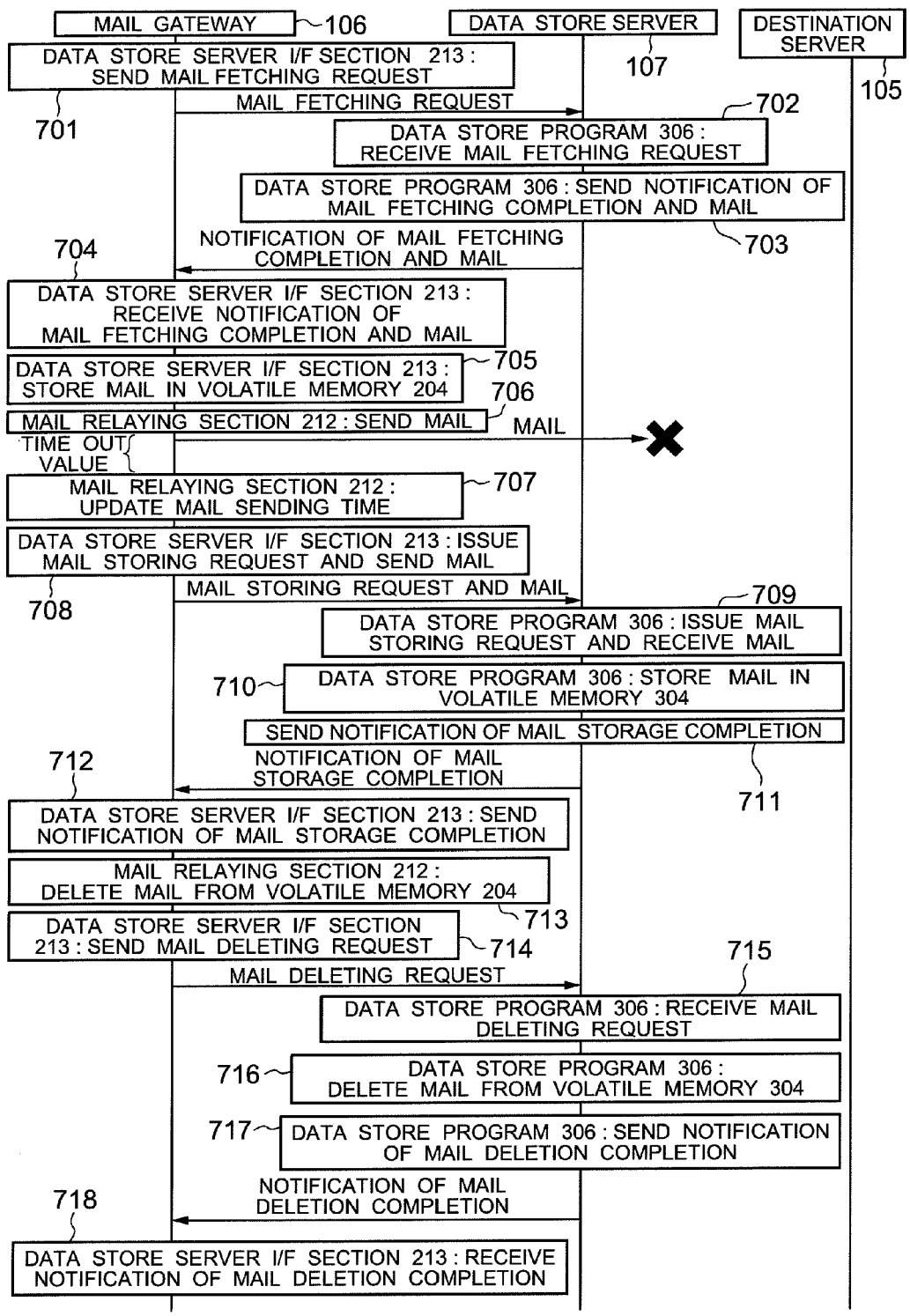
FIG. 8 is a flow diagram exemplifying a sequence of resending mails by the mail gateway 106 when mails cannot be sent to the destination server 105.

FIGS. 6, 7 and 8 illustrate a sequence in which the mail gateway 106 receives and sends mails. According to this embodiment, a sequence is described that is dedicated especially to the storing of mails in, the fetching of mails by, and the deleting of mails from the data store server 107, and therefore a sequence corresponding to the case where the storing of mails in the data store server 107 does not take place, that is, the case where the relaying of mail data to the destination server 105 is successful, will not be taken up.

In the sequence of receiving and sending mails, mails, various requests and notifications are exchanged between the data store server I/F part 213 of the mail gateway 106 and the data store server 105. Actually exchanged data include header information, and payloads representing data bodies. In the following explanation, actually exchanged data are mentioned as mails constituting payloads, various requests and notifications for convenience of explanation regarding mail reception and sending. The same is true of mails and various notifications exchanged between the mobile terminal 101 and the data store server I/F part 213 of the mail gateway 106. When the storing of mails in, the fetching of mails by, and the deleting of mails from the volatile memory part 307 of the data store server 107 take place, the sequence management information 312 is exchanged several times between the data store server I/F part 213 of the mail gateway 106 and the data store server 107. In this case where description is given especially to a sequence for receiving and sending mails, such processes including the exchange of the sequence management information 312 as the storing, fetching or deleting of mails are represented in the form of 1 response to 1 request.

FIG. 6 is a flow diagram exemplifying a sequence of receiving mails by the mail gateway 106 when mails cannot be sent to the destination server 105 for a certain period of time. The cause of such continuous incapability of sending mails to the destination server 105 may involve the failure of the destination server 105, the congestion of mails to the destination server 105, or the interruption of the network between the mail gateway 106 and the destination server 105. In such a case, all the mails that failed to be sent to the destination server 105 are deemed to be errors, and the mail gateway 106 must retain such error mails until the sending of mails to the destination server 105 becomes possible.

First, the mobile terminal 101 sends a mail to the mail gateway (step 501). Then, the mail relaying part 212 of the mail gateway 106 receives the mail (step 502) and stores the mail in the volatile memory 207 (step 503).

Next, the mail relaying part 212 of the mail gateway 106 sends the mail data to the destination server 105 (step 504).

When a preset time out period is exceeded by the time for which the mail relaying part 212 remains incapable of receiving a response after the sending of the mail, the mail relaying part 212 updates the mail sending time (step 505). This mail sending time is defined as the sending time at the instant that the preset time out period has just been exceeded, plus a preset resending time.

The data store server I/F part 213 of the mail gateway sends a mail storing request and a mail to the data store server 107 (step 506).

The data store server program 306 of the data store server 107 receives the mail storing request and the mail data (step 507), and the mail data is stored in the volatile memory 304 (step 508). Although not shown in FIG. 6, if the store of mail fails in step 506, the data store server program 306 returns a notification of mail store failure to the mail gateway 106, which returns the notification to the mobile terminal 101.

The data store server program 306 of the data store server 107 then sends a notification of mail store completion to the mail gateway 106 (step 509), and the data store server I/F part 213 of the mail gateway 106 receives the notification (step 510).

The mail relaying part 212 of the mail gateway 106 sends a notification of mail sending completion to the mobile terminal 101 (step 511), and the mobile terminal 101 receives the notification (step 512). After step 509, the mail relaying part 212 of the mail gateway 106 deletes the mail data from the volatile memory part 307.

FIG. 7 is a flow diagram exemplifying a sequence of resending mails by the mail gateway 106.

First, the data store server I/F part 213 of the mail gateway 106 sends a mail fetching request to the data store server 107 (step 601). Then, the data store server program 306 of the data store server 107 receives the mail fetching request (step 602) and sends a notification of mail fetch completion and a mail data to the mail gateway 106 (step 603).

Further, the data store server I/F part 213 of the mail gateway 106 receives the notification of mail fetching completion and the mail data (step 604), and the received mail data is stored in the volatile memory part 207 (step 605). Thereafter, the mail relaying part 212 of the mail gateway 106 sends the mail data to the destination server 105 at the time when the fetched mail data is to be sent (step 606).

Next, the destination server 105 receives the mail data sent from the mail gateway 106 (step 607) and then returns a notification of mail sending completion to the mail gateway 106 (step 608).

The mail relaying part 212 of the mail gateway 106 receives the notification of mail sending completion from the destination server 105 (step 609) and deletes the mail data from the volatile memory part 207 (step 610). And the data store server I/F part 213 of the mail gateway 106 sends a mail deletion request to the data store server 107 (step 611). Then, the data store server program 306 of the data store server 107 receives the mail deletion request (step 612), deletes the mail data from the volatile memory part 307 (step 613), and sends a notification of mail deletion completion to the mail gateway 106 (step 614).

Finally, the data store server I/F part 213 of the mail gateway 106 receives the notification of mail deletion completion sent from the data store server 107 (step 615).

FIG. 8 is a flow diagram exemplifying a sequence of resending mails by the mail gateway 106 when mails cannot be sent to the destination server 105 for a certain period of time.

First, the data store server I/F part 213 of the mail gateway 106 sends a mail fetching request to the data store server 107 (step 701). The data store server program 306 of the data store server 107 receives the mail fetching request (step 702), and the data store server program 306 of the data store server 107 sends a notification of mail fetching completion and a mail data to the mail gateway 10 (step 703).

Then, the data store server I/F part 213 of the mail gateway 106 receives the notification of mail fetching completion and the mail data (step 704). The received mail is then stored in the volatile memory part 207 (step 705). And the mail relaying part 212 of the mail gateway 106 sends the fetched mail data to the destination server 105 at the time that the fetched mail data is to be sent (step 706).

The mail relaying part 212 updates the mail sending time (step 707) when the preset time out period is exceeded by the time for which the mail relaying part 212 remains incapable of receiving a response after the sending of the mail. This mail sending time is defined as the sending time at the instant that the preset time out period has been exceeded, plus a preset resending time.

Next, the data store server I/F part 213 of the mail gateway 106 sends a mail store request and a mail data to the data store server 107 (step 708). The mail data sent at this time is that which has had its sending time updated in step 707.

Now, the data store server program 306 of the data store server 107 receives the mail store request and the mail data (step 709) and then stores the mail data in the volatile memory 304 (step 710).

Then, the data store server program 306 of the data store server 107 sends a notification of mail store completion to the mail gateway 106 (step 711), and the data store server I/F part 213 of the mail gateway 106 receives the notification of mail store completion (step 712).

The mail relaying part 212 of the mail gateway 106 deletes the mail data from the volatile memory part 207 (step 713), and the data store server I/F part 213 of the mail gateway 106 sends a mail deletion request to the data store server 107 (step 714). It should be noted here that the mail data requested to be deleted is the one which has its sending time not yet updated. Since at the present time the mail data whose sending time has not yet been updated and the mail data whose sending time has been updated are both stored in the volatile memory part 307 of the data store server 107, the older one of the mails must be deleted.

Then, the data store server program 306 of the data store server 107 receives the mail deletion request (step 715), deletes the mail from the volatile memory part 307 (step 716), and sends a notification of mail deletion completion to the mail gateway 106 (step 717).

Finally, the data store server I/F part 213 of the mail gateway 106 receives the notification of mail deletion completion sent from the data store server 107 (step 718).

Figure 9:
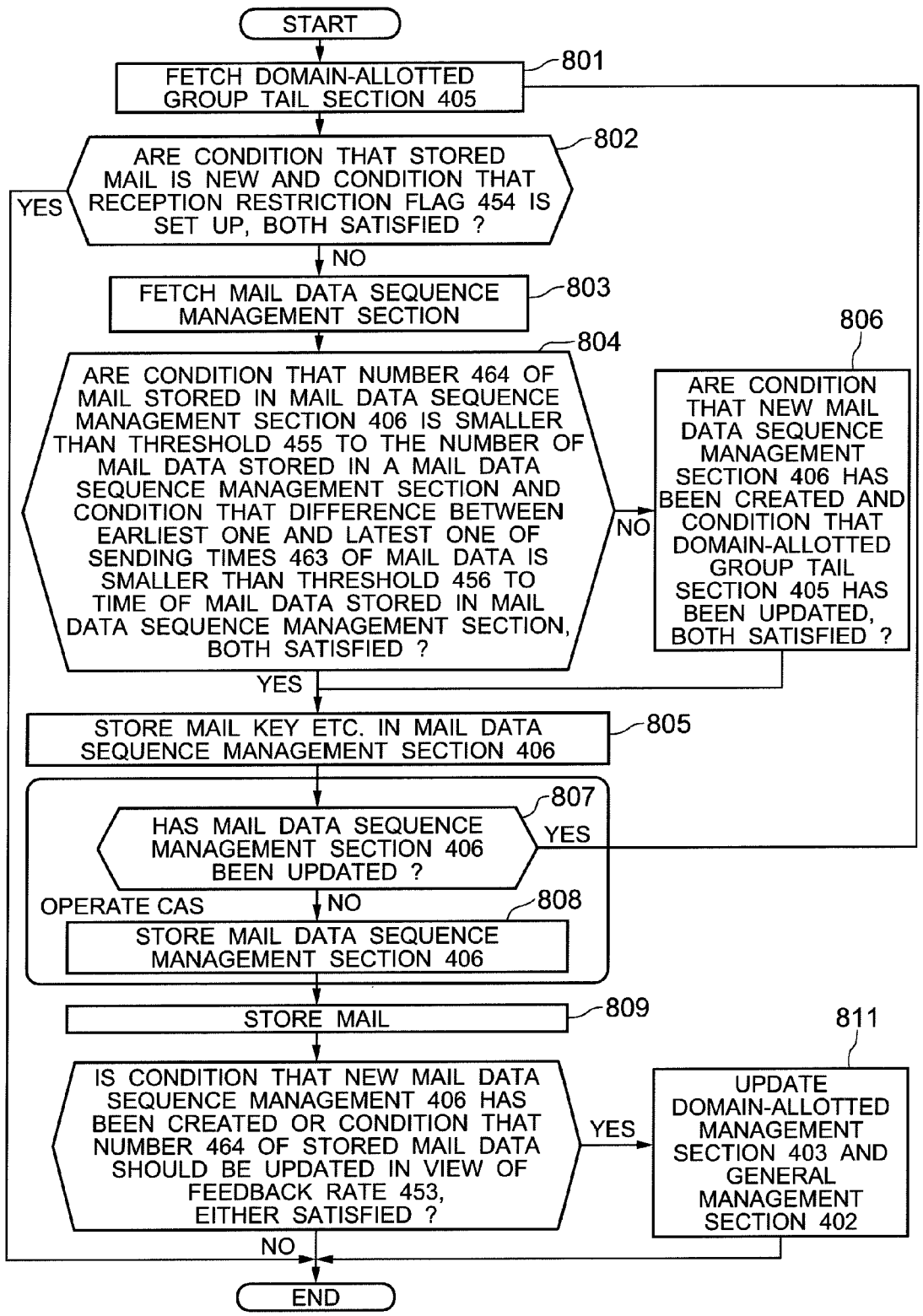
FIG. 9 is a flow diagram of a process for storing mails by the data store server I/F part 213 of the mail gateway 106.

FIG. 9 is a flow diagram of a process for storing mails by the data store server I/F part 213 of the mail gateway 106. This process flow exemplifies the operation of the data store server I/F part 213 of the mail gateway 106, taking place between the steps 506 and 510 in the sequence shown in FIG. 6, and between the steps 708 and 712 in the sequence shown in FIG. 8.

First, the data store server I/F part 213 fetches the tail parts 405 of each domain group from the data store server 107 (step 801). Regarding the fetching of the tail parts 405 of each domain group, the following two ways are possible: the tail part 405a of each domain group may be fetched by directly specifying the key having the tail parts 405 of each domain group as its value depending on the destination address of the mail data to be stored; or alternatively the general management part 402 is first fetched, the related domain management part 403a is fetched depending on the keys 414 to each management parts of each domain in the general management part 402, and the tail part 405a of each domain group may be fetched by specifying the key having the domain management part 403a as its value depending on the keys 429 to each tail part of each domain group.

In the former procedure, the fetching of tail parts 405 of each domain group requires the data store server I/F part 213 of the mail gateway 106 so that the change in the fetching rule can only be performed by changing the mail gateway program 206. However, since this procedure enables the tail parts 405 of each domain group to be directly fetched, the communication process exchanged between the mail gateway 106 and the data store server 107 can be simplified.

In the latter procedure, since the fetching of the tail parts 405 of each domain group requires the general management part 402 or the domain management parts 403, the change in the fetching rule can be performed by changing the sequence management information so that the procedure can be said to be more flexible. However, in this procedure, since the fetching of general management part 402 and the domain management parts 403 is necessary, the communication process exchanged between the mail gateway 106 and the data store server 107 becomes more complicated.

If the latter of the two procedures described above is basically employed so that the information on the tail parts 405 of each domain group is stored as cache in the volatile memory part 207 for a predetermined period of time and if the former of the two procedures is employed when cache data exists, then flexibility can be compatible with low communication processing cost.

In case where a mail to be stored is new and where reception control flag 454 in the fetched tail part 405a of each domain group was set up, the ongoing process is finished. If not, however, the process proceeds to step 803 (step 802). The reception control flag 454 is set up if the number of the mails held in the data store server 107 exceeds a predetermined value or if the number of those mails stored in the data store server 107 which are under the management of any one of the domain management parts 403 exceeds a predetermined value. This reception control flag 454 is effective for a new mail, but no reception restriction is imposed on mails stored for the purpose of resending.

The sequence management part 406 of mail data is fetched by using the key 452 to the management part 406 of mail data in the fetched tail parts 405 of each domain (step 803); whether or not mails can be stored in the fetched sequence management parts 406 of mail data is checked (step 804); and the process proceeds to step 806 if the condition for storing is not satisfied, and to step 805 if the condition is satisfied.

The condition for storing is set up based on threshold number 455 of stored mail data in the sequence management part of mail data in the fetched tail parts 405 of each domain and threshold time 456 of stored mail data in the sequence management part of mail data, and deemed to be satisfied if two of the following premises are satisfied:

the number 464 of stored mail data in the fetched sequence management part 406 of mail data is smaller than the threshold number 455 of stored mail data in the sequence management part of mail data.

the difference between the earliest one of the sending times 463 of each mail data in the fetched sequence management part 406 of mail data and the sending time of a mail data to be stored, is smaller than the threshold time 456 of stored mail data in the sequence management part of mail data.

The provision of these conditions enables the mail groups stored in the respective sequence management parts 406 of mail data to be collected in such a manner that they can be sent to the destination server 105 on an aggregated basis.

In step 806, the data store server I/F part 213 creates a new sequence management part 406 of mail data and stores the new sequence management part 406 of mail data in the data store server 107. As a result of this process, the sequence management parts 406 of mail data will be divided by mail sending units in accordance with the two conditions given above. Further, the key 452 to the sequence management part of mail data within the fetched tail parts 405 of each domain is updated to the key having the value for the new sequence management part 406 of mail data. And the updated tail part 405 of each domain is stored in the data store server 107.

In step 805, the data store server I/F part 213 stores the key having the stored mail as its value in the key 462 to each mail data in the fetched sequence management part 406 of mail data. At the same time, the sending time of the stored mail data is added to the each sending time 463 of mail data in the fetched sequence management part 406 of mail data; the number 464 of the stored mail data in the fetched sequence management part 406 of mail data is increased by one; and the data size of the mail data to be stored is added to the data size 465 of the mail data to be stored in the fetched sequence management part 406 of mail data.

In step 807, the data store server I/F part 213 checks whether or not the sequence management part 406 of mail data stored in the volatile memory part 307 in the data store server 107 is identical with what was fetched in the step 801. If they are identical with each other, the process proceeds to step 808. If, on the other hand, they are different from each other, the process proceeds to step 801 since an inconsistency occurs if the sequence management part 406 of mail data is stored as it is. This process is called "CAS (Compare And Swap)" operation and assures the atomic operation of data to be stored in the volatile memory part 307 in the data store server 107. In the CAS operation, after it has been ascertained that the data to be stored is not updated since it was fetched, the store operation is performed. The CAS operation needs to be utilized in the previous step 806, and when the atomic operation fails in 806, the step 801 is reached likewise. The CAS operation must necessarily be used when the data already stored in the volatile memory part 307 in the data store server 107 is updated, but need not be used when the data to be newly added is added or the data is deleted.

When the atomic operation is successful in the store of the data sequence management section 406, it is normally stored in the volatile memory part 307 in the data store server 107 (step 808).

Then, the data store server I/F part 213 stores the key, setting the mail to be stored as value, having been stored in the key 462 to each mail data within the sequence management part 406 of mail data in step 805 setting the mail to be stored as value, into the volatile memory part 307 in the data store server 107 (step 809).

If the store of mail data precedes the store of data sequence management part 406, then when the operation of the mail gateway 106 stops due to power source failure or server interference after the mail store operation has been finished, the sequence management part 406 of mail data having the key for the stored mail data 313 does not exist and it becomes difficult to read the stored mail data 313. If this situation occurs frequently, the area available for store in the volatile memory part 307 in the store data server 107 is adversely occupied by such unreadable mail data 313. In this embodiment, therefore, the mail store (step 809) is performed after the store of the sequence management part 406 of mail data (step 808). Accordingly, unreadable mail data can be prevented from accumulating in the volatile memory part 307 in the store data server 107.

In step 810, the data store server I/F part 213, throughout the entire process, checks whether a new sequence management part 406 of mail data has been created or whether the stored mail data number 464 in the sequence management part 406 of mail data stored in step 808 is a multiple of the feedback rate 453 in the tail parts 405 of each domain. If any one of the two conditions is satisfied, step 811 is reached, but if none of the conditions is satisfied, the process ends.

The feedback rate 453 indicates the frequency of updating the domain management part 403 and the general management part 402. If the feedback rate 453 is set to be small, the update frequency becomes high, whereas if the feedback rate 453 is set to be large, the update frequency becomes low. If the update frequency becomes high, the precision of the information in the domain management part 403 and the general management part 402 becomes high, and therefore the resulting processing load increases. If, on the other hand, the update frequency becomes low, the precision of the information in the domain management part 403 and the general management part 402 becomes low, and therefore the resulting processing load decreases. Therefore, in the case where the precision of information is of priority, such as when the number of stored mails is approaching its upper limit, the feedback rate 453 is set to be small. On the other hand, if a high precision of information is not required, the feedback rate 453 is set to be large. Thus, a flexible operation can be performed.

In step 811, the data store server I/F part 213 updates the domain management part 403 and the general management part 402.

The update of the domain management part 403 causes the stored mail data number 464 and the stored mail data size 465 in the sequence management part 406 of mail data stored in step 808 to be reflected in the data size 430 and queue size 431 of the sequence management part of mail data in the domain management part 403. Thereafter, on the basis of the reflected data size 430 and queue size 431 of the sequence management part of mail data in the domain management part 403, the data size 422 and queue size 423 are calculated respectively from the sum of the data sizes 430 and queue sizes 431 of each sequence management part of mail data, and the calculated items are reflected. Now, if the data size 422 has reached the upper limit of the number of stored mails for each domain, the associated reception control flag 425 is set up, reference is then made to the key 429 to each tail parts 405 of each domain group, and the reception control flag 454 in each tail parts 405 of each domain group is set up.

The update of the general management part 402 causes the values of the data size 422 and queue size 423 of the domain management part 403 updated in the foregoing procedure to be reflected in the data size 415 and queue size 416 of each domain management part 403 in the general management part 402. Thereafter, on the basis of the reflected data size 415 and queue size 416 of each domain management part 403 in the general management part 402, the data size 412 and the queue size 413 are calculated respectively from the aggregated data sizes 415 and queue sizes 416 of the respective domain management part 403, and the calculated results are reflected. Now if the data size 412 has reached the upper limit of the number of all the stored mails, reference is made to the key 414 to the respective domain management part 403, the reception control flags 425 in the domain management part 403 are set up, reference is further made to the keys 429 to the tail parts 405 of each domain group, and the reception control flags 454 in the respective tail parts 405 of each domain group are set up.

Regarding steps after step 810, a new mail may be sent to the mobile terminal 101 after a sending completion notification has been sent to the mobile terminal 101 following step 809. By doing so, the sending completion notification to the mobile terminal 101 can be sent at an early stage.

Figure 10:
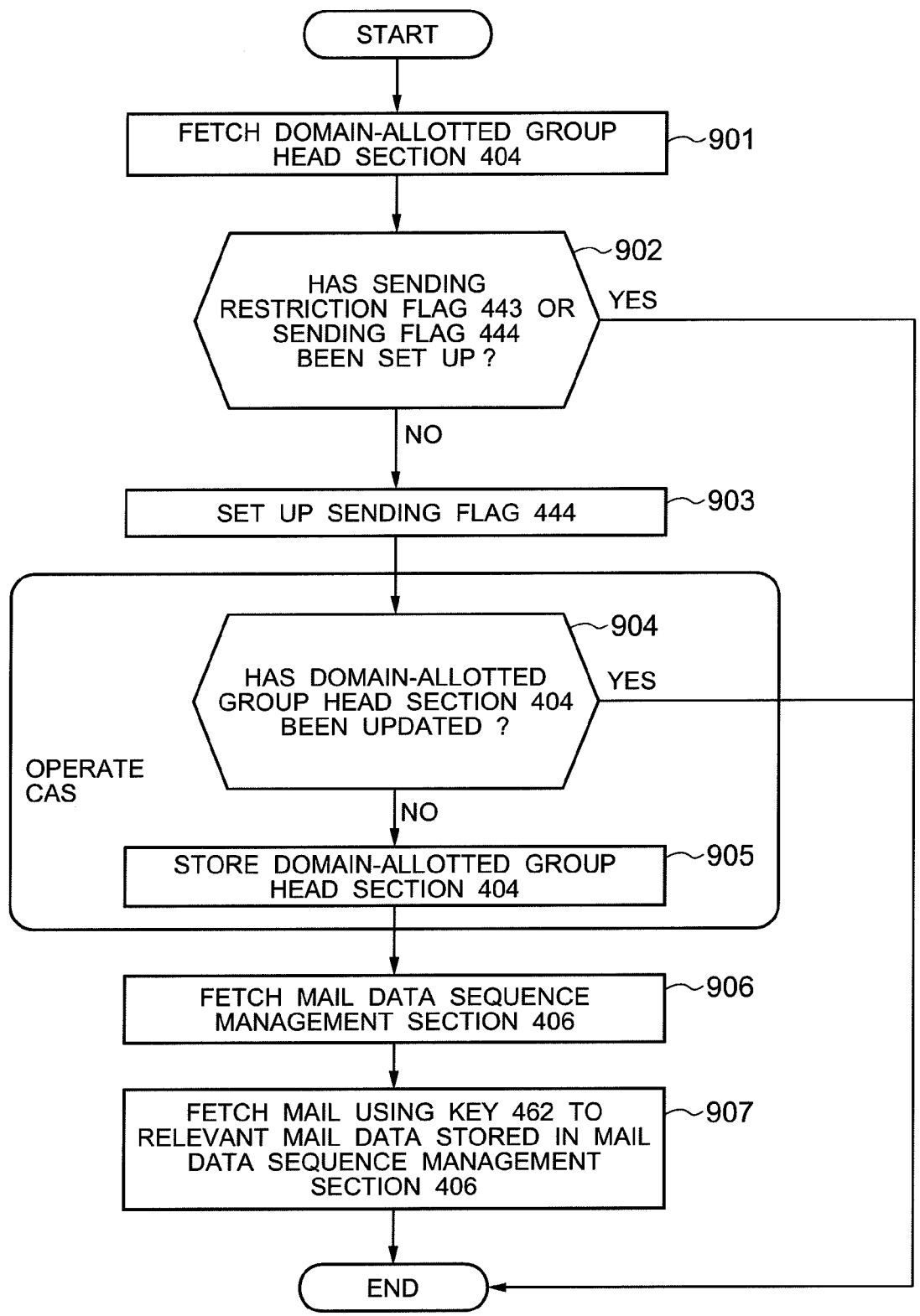
FIG. 10 is a flow diagram of a process for fetching mails by the data store server I/F part 213 of the mail gateway 106.

FIG. 10 is a flow diagram of a process for fetching mails by the data store server I/F part 213 of the mail gateway 106. This process flow exemplifies the operation of the data store server I/F part 213 of the mail gateway 106, taking place between the steps 601 and 604 in the sequence shown in FIG. 7, and between the steps 701 and 704 in the sequence shown in FIG. 7.

First, the data store server I/F part 213 fetches the head parts 404 of each domain group from the data store server 107 (step 901). Regarding the fetching of the head parts 404 of each domain group, the following two ways are possible as in the fetching of the tail parts 405 of each domain group: the head parts 404 of each domain group may be fetched by directly specifying the key having the head parts 404 of each domain group as its value depending on the destination address of the mail data to be stored; or alternatively the general management part 402 is first fetched, the related domain management part 403 is fetched depending on the keys 414 to each domain management part 403 in the general management part 402, and the pertinent head parts 404 of each domain group may be fetched depending on the keys 428 to each head parts 404 of each domain group in the fetched domain management part 403. Or it is possible that the latter procedure is basically employed, that the information on the tail parts 405 of each domain group is held as cache in the volatile memory part 207 for a fixed period of time, and that the former procedure is employed when data exist in the cache.

Then, when the sending control flag 443 or sending flag 444 in the fetched head parts 404 of each domain group is set up, the process goes to the end. But if this is not the case, step 903 is reached (step 902). The sending control flag 443 is set up when mails exceeding the predetermined number are sent so that the sending of mails is restricted. The sending flag 444 is set up when there is a mail gateway 106 that has already fetched the mail of the pertinent domain-allotted group and is sending it.

In step 903, the sending flag 444 in the head parts 404 of each domain group is set up. The setup of the sending flag 444 at this time makes it possible to indicate that the fetching of the mail of the pertinent domain group and the sending of the mail data are under way.

In step 904, the data store server I/F part 213 checks whether or not the head parts 404 of each domain group stored in the volatile memory part 307 of the data store server 107 is identical with what was fetched in step 901. If they are identical with each other, step 905 is reached; but if otherwise, the process goes to end. This procedure is the CAS operation mentioned above, securing the atomic operation of the data to be stored in the volatile memory part 307 of the data store server 107.

When the atomic operation on the store of the head part 404 of each domain group is successful, the head part 404 of each domain group is normally stored in the volatile memory part 307 of the data store server 107 (step 905).

Then, by using the key 442 to the sequence management part of mail data in the fetched head parts 404 of each domain group, the sequence management part 406 of mail data is fetched (step 906), and by using the key 462 to each mail data in the fetched sequence management part 406 of mail data, mail data 313 is fetched to end the process.

FIG. 11 is a flow diagram of a process for sending and deleting mails by the mail gateway 106. This process flow exemplifies the operation of the mail gateway program 206 in the mail gateway 106, taking place between the steps 606 and 615 in the sequence shown in FIG. 7, and between the steps 714 and 718 in the sequence shown in FIG. 8.

First, the mail relaying part 212 sends a mail to the destination server 105, fetches a mail sending completion notification from the destination server 105 (step 1001), and deletes the mail from the volatile memory part 207 (step 1002).

Then, the data store server I/F part 213 fetches the head parts 404 of each domain group from the data store server 107 (step 1003), and further fetches the sequence management part 406 of mail data by using the key to the sequence management part of mail data in the fetched head parts 404 of each domain group (step 1004). It should be noted here that the head parts 404 of each domain group may be fetched by using any procedure whatever as in the foregoing description.

In step 1005, the information of the send mail data is deleted from the key 462 to and sending time 463 of each mail data in the fetched sequence management part 406 of mail data.

In step 1006, the data store server I/F part 213 checks whether or not the sequence management part 406 of mail data stored in the volatile memory part 307 of the data store server 107 is identical with what was fetched in step 1004. If they are identical with each other, step 1007 is reached, but if otherwise, step 1004 is reached. This procedure is the CAS operation mentioned above, securing the atomic operation of the data to be stored in the volatile memory part 307 of the data store server 107.

When the atomic operation on the store of the head parts 404 of each domain group is successful, the sequence management part 406 of mail data is normally stored in the volatile memory part 307 of the data store server 107 (step 1007).

In step 1008, reference is made to the key 462 to and sending time 463 of each mail data in the sequence management part 406 of mail data updated through the foregoing steps, and whether or not there is any mail data still stored is checked. If there is a mail data still stored, the process goes to end, but if otherwise, step 1009 is reached.

In step 1009, the data store server I/F part 213 updates the head parts 404 of each domain group, deletes the sequence management part 406 of mail data, and updates the domain management part 403 and the general management part 402.

The update of the head parts 404 of each domain group results in the substitution of the key 442 to the sequence management part of mail data by the content of the key 466 to the next sequence management part of mail data in the sequence management part 406 of mail data, and further in the reset of the sending flag 444.

The update of the domain management part 403 causes the deletion of the information on the deleted sequence management part 406 of mail data from the data size 430 and queue size 431 of each sequence management part of mail data in the domain management part 403. Thereafter, on the basis of the reflected data size 430 and queue size 431 of each sequence management part of mail data in the domain management part 403, the data size 422 and the queue size 423 are calculated respectively from the sum of the data sizes 430 of the each sequence management part of mail data and the sum of the queue sizes 431 of the respective sequence management part of mail data, and the calculated results are reflected. Further, the sending rate 424 is updated to the latest rate depending on the time when the process is performed and the number of mails sent out during the current process. And the connection number 427 is decremented by one.

When the sending rate 424 has reached the upper limit of sending rate of each domain, the sending control flag 426 is set up, reference is made to the key 429 to the tail parts 405 of each domain group, the sending control flag 443 in the each head parts 404 of each domain group is set up. Also, when reception restriction is no more necessary, the reception control flag 425 is reset in the data size 422 and queue size 423 of the updated domain management section 403. Further, reference is made to the key 429 to the tail parts 405 of each domain group, and the reception control flag 454 in the tail parts 405 of each domain group is reset.

As a result of the update of the general management part 402, the data size 415 and queue size 416 of the domain management part 403 in the general management part 402 reflects the values of the data size 422 and queue size 423 of the domain management part 403 updated in the procedure described above. Thereafter, on the basis of the reflected data size 415 and queue size 416 of the domain management part 403 in the general management part 402, the data size 412 and queue size 413 are calculated respectively from the totalized data sizes 415 and the totalized queue sizes 416 of the each domain management parts, and the calculated result is reflected. When the data size 412 indicates that the reception restriction for mails is deemed unnecessary, reference is made to the key 414 to the domain management part 403, the reception control flag 425 in the domain management part 403 is reset, reference is also made to the key 429 to the tail parts 405 of each domain group, and the reception control flag 454 in the tail parts 405 of each domain group is reset.

Although the present disclosure has been described with reference to example embodiments, those skilled in the art will recognize that various changes and modifications may be made in form and detail without departing from the spirit and scope of the claimed subject matter.

What is claimed is:

1. A mail server for storing in a data store server mails received from a mail sending apparatus, wherein the mail server includes,
    at every domain of respective destination addresses of the mail, sequence management information for each domain which manages (at least) a sequence of stored mails and transmission time when the mail server sends the stored mails to a destination server,
    wherein the sequence management information for each domain is used to manage data size and number of mails managed thereby, and includes a plurality of lower rank sequence management information, each of which is used to manage each entry defined as a combination of a key corresponding to the mail as a value thereto, and the transmission time, wherein each of the plurality of lower rank sequence management information is used to manage data size and number of mails managed thereby, and wherein the mail server prepares each of the plurality of lower rank sequence management information so as to satisfy conditions that the number of entries in the each lower rank sequence management information is made not greater than a predetermined number, and that a difference between earliest and latest sending times of mails included in the entries contained within the each lower rank sequence management information is made not greater than a predetermined value, wherein the mail server manages the plurality of lower rank sequence management information in a ranked manner, and wherein the mail server updates the data size and the number of mails managed by the sequence management information for each domain by using the data size and the number of mails managed by each of the plurality of lower rank sequence management information.

2. The mail server according to claim 1, wherein the mail server compares the data size managed by the sequence management information for each domain with a predetermined upper limit, to thereby set or reset a reception control flag of the sequence management information for each domain, and to thereby set or reset a reception control flag of the lower rank sequence management information at an end point of the sequence management information for each domain.

3. The mail server according to claim 2, wherein the mail server includes upper rank sequence management information used to manage total data size and total number of mails managed by the plurality of sequence management information for each domain, wherein the mail server updates the total data size and the total number of mails managed by the upper rank sequence management information by using the data size and the number of mails managed by the sequence management information for each domain, and wherein the mail server compares the total data size managed by the upper rank sequence management information with a predetermined upper limit, to thereby set or reset a reception control flag of the sequence management information for each domain, and to thereby set or reset a reception control flag of the lower rank sequence management information at an end point of the sequence management information for each domain.

4. The mail server according to claim 1, wherein the mail server includes upper rank sequence management information used to manage total data size and total number of mails managed by the plurality of sequence management information for each domain, wherein the mail server updates the total data size and the total number of mails managed by the upper rank sequence management information by using the data size and the number of mails managed by the sequence management information for each domain, and wherein the mail server compares the total data size managed by the upper rank sequence management information with a predetermined upper limit, to thereby set or reset a reception control flag of the sequence management information for each domain, and to thereby set or reset a reception control flag of the lower rank sequence management information at a tail part of the sequence management information for each domain.

* * * * *